(12) United States Patent
Brockhaus et al.

(10) Patent No.: US 12,395,355 B2
(45) Date of Patent: Aug. 19, 2025

(54) METHOD FOR SECURELY REPLACING A FIRST MANUFACTURER CERTIFICATE ALREADY INTRODUCED INTO A DEVICE

(71) Applicant: Siemens Mobility GmbH, Bayern (DE)

(72) Inventors: Hendrik Brockhaus, Unterbiberg (DE); Jens-Uwe Bußer, Neubiberg (DE)

(73) Assignee: SIEMENS MOBILITY GMBH, Bayern (DE)

( * ) Notice: Subject to any disclaimer, the term of this patent is extended or adjusted under 35 U.S.C. 154(b) by 301 days.

(21) Appl. No.: 16/638,862

(22) PCT Filed: Aug. 9, 2018

(86) PCT No.: PCT/EP2018/071583
§ 371 (c)(1),
(2) Date: Feb. 13, 2020

(87) PCT Pub. No.: WO2019/034509
PCT Pub. Date: Feb. 21, 2019

(65) Prior Publication Data
US 2020/0366506 A1 Nov. 19, 2020

(30) Foreign Application Priority Data
Aug. 17, 2017 (DE) .................... 10 2017 214 359.2

(51) Int. Cl.
*H04L 9/32* (2006.01)
*G06F 21/57* (2013.01)
*H04L 9/40* (2022.01)

(52) U.S. Cl.
CPC ............ *H04L 9/3268* (2013.01); *G06F 21/57* (2013.01); *H04L 63/0823* (2013.01)

(58) Field of Classification Search
CPC ..................................................... H04L 9/3268
See application file for complete search history.

(56) References Cited

U.S. PATENT DOCUMENTS 9,641,344 B1 * 5/2017 Kim ........................ H04L 9/006
9,729,332 B2 * 8/2017 Unagami ................ G06F 21/44
(Continued)

FOREIGN PATENT DOCUMENTS

CN 101136743 A 3/2008
CN 102523095 A 6/2012
(Continued)

OTHER PUBLICATIONS

RFC 5280, Cooper D et al: "Internet X.509 Public Key Infrastructure Certificate and Certificate Revocation List (CRL) Profile",; ISSN: 0000-0003; XP015057243; pp. 1-151 WORD; 2008; http://www.rfc-editor.org/pdfrfc/rfc2580.txt.pdf.
(Continued)

*Primary Examiner* — Benjamin E Lanier
(74) *Attorney, Agent, or Firm* — Schmeiser, Olsen & Watts LLP

(57) ABSTRACT

Provided is a method for the secure replacement of a first manufacturer certificate already incorporated into a device with a second manufacturer certificate, having the steps: —identifying at least one specific device-related parameter that uniquely identifies the device and that is contained in the first manufacturer certificate and uniquely identifies the device from a trusted device database, —generating a second manufacturer certificate containing at least the specific device-related parameter of the first certificate; and —incorporating the first manufacturer certificate into the device through the second manufacturer certificate, as well as a system designed to perform the method.

10 Claims, 1 Drawing Sheet

(56) References Cited

U.S. PATENT DOCUMENTS

Figure 1:
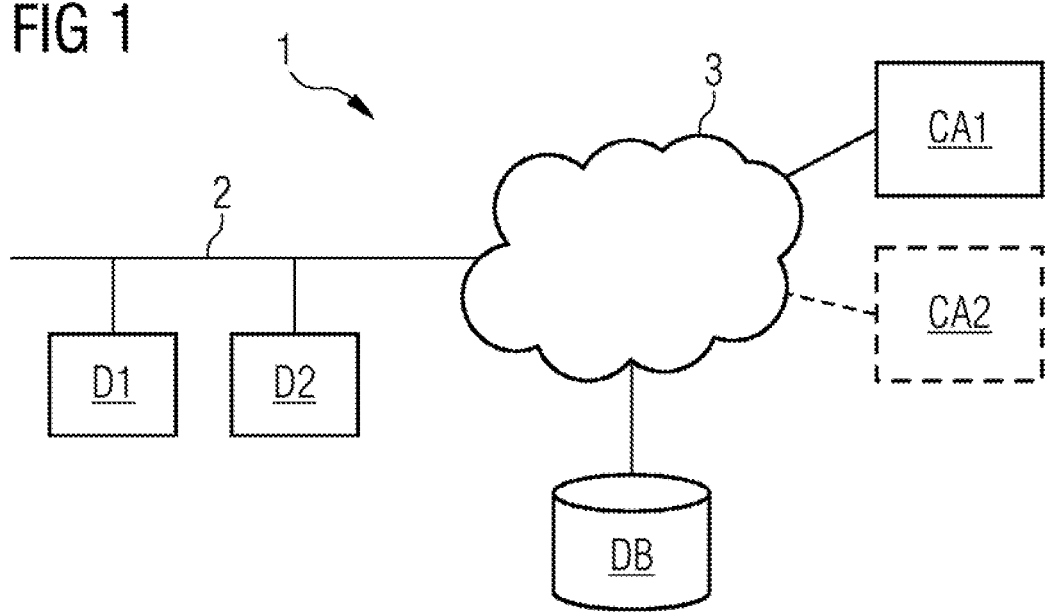

| | | | |
|---|---|---|---|
| 2004/0148505 A1* | 7/2004 | Qiu | G06F 21/33 |
| | | | 713/175 |
| 2006/0236379 A1* | 10/2006 | Negahdar | H04L 9/3263 |
| | | | 726/5 |
| 2007/0055881 A1 | 3/2007 | Fuchs et al. | |
| 2013/0238895 A1* | 9/2013 | Dixon | H04L 63/0823 |
| | | | 713/156 |
| 2013/0346747 A1 | 12/2013 | Ignatchenko | |
| 2014/0173688 A1 | 6/2014 | Fischer et al. | |
| 2014/0281497 A1* | 9/2014 | Medvinsky | H04L 9/006 |
| | | | 713/156 |
| 2015/0236851 A1* | 8/2015 | Bi | H04L 9/3268 |
| | | | 380/282 |
| 2015/0256345 A1* | 9/2015 | Vaid | H04L 9/3268 |
| | | | 713/158 |
| 2015/0365241 A1* | 12/2015 | Vlot | H04L 9/3268 |
| | | | 713/158 |
| 2016/0057134 A1 | 2/2016 | Falk et al. | |
| 2016/0294829 A1* | 10/2016 | Angus | H04L 63/18 |
| 2017/0054566 A1* | 2/2017 | Nitschke | H04L 9/3297 |
| 2018/0262345 A1* | 9/2018 | Frederick | H04L 9/3247 |

FOREIGN PATENT DOCUMENTS

| | | |
|---|---|---|
| CN | 103312503 A | 9/2013 |
| DE | 102011081804 A1 | 2/2013 |
| DE | 102013205051 A1 | 9/2014 |

OTHER PUBLICATIONS

Standard RFC 6960 S. Santesson et al.; Internet Engineering Task Force (IETF) "X509 Internet Public Key Infrastructure Online Certificate Status Protocol—OCSP" http://www.rfc-editor.org/pdfrfc/rfc6960.txt.pdf.

PCT International Search Report mailed Oct. 22, 2018 corresponding to PCT International Application No. PCT/EP2018/071583 filed Aug. 9, 2018.

\* cited by examiner

METHOD FOR SECURELY REPLACING A FIRST MANUFACTURER CERTIFICATE ALREADY INTRODUCED INTO A DEVICE

CROSS-REFERENCE TO RELATED APPLICATIONS

This application claims priority to PCT Application No. PCT/EP2018/071583, having a filing date of Aug. 9, 2018, which is based on German Application No. 10 2017 214 359.2, having a filing date of Aug. 17, 2017, the entire contents both of which are hereby incorporated by reference.

FIELD OF TECHNOLOGY

The following relates to a method for securely replacing a first manufacturer certificate already introduced into a device with a second manufacturer certificate without having to return the device to the manufacturer. In addition, the following relates to a system and to a corresponding computer program product.

BACKGROUND

Authentication of users, machines and processes is increasingly becoming one of the basic requirements for secure operation of systems and installations. A tried-and-tested means for securely performing this authentication is the use of digital certificates, which is advancing ever further and also replacing already established processes based on passwords. In particular in highly critical systems in the areas of transport, power supply, production and medical engineering, digital certificates are being used to an increasing extent.

Typical use scenarios for digital certificates, which in particular contain a public key for authentication and for integrity protection and/or for encryption, are for example
  certificates used for setting up a secure communication connection, for example with the aid of the transport layer security protocol TLS, to web servers,
  certificates for people, digital identity cards, access control or e-mail,
  operative certificates for devices for communication, for signing logging data or for decrypting software or configuration data, or
  manufacturer certificates for devices for proving originality and as trust anchors for requesting further security-relevant data, which is also referred to as bootstrapping.

Most of these certificates are issued only for a rather short period, typically one to three years, and renewed on expiry. Only manufacturer certificates are supposed to be valid for the entire life of the associated device, which can be 30 years or longer. There is normally no provision for these manufacturer certificates to be replaced or updated.

If a certification authority that has issued such a manufacturer certificate is then compromised, manufacturer certificates issued thereby can no longer be trusted. If an attacker succeeds in manipulating a peripheral PKI component, such as a local registration authority, for example, he can use it to have certificates created by the central certification authority. Some of the data contained in the certificate can be influenced or even stipulated by the attacker, for example the public key or identification features of the certificate holder, whereas other portions are determined by the certification authority in accordance with the defined certificate profile, for example time of creation, validity period, serial number of the certificate and purpose of use.

All certificates created are usually logged in a database by the certification authority. If improper use is discovered, it is sufficient for the certificates issued without authorization to be identified and revoked. To this end, the certificate serial numbers of the certificates issued without authorization are entered into a certificate revocation list and/or into a database for a certificate status protocol, also called online certificate status protocol OCSP. Legitimately issued certificates can continue to be used.

If it is not possible or too complicated to identify all certificates issued without authorization individually, then it is also possible to revoke all certificates requested by the manipulated registration authority during the period of manipulation.

If an attacker is able to acquire the private signature key of the certification authority by copying or theft, he can use it to create certificates having any content, in particular including back-dated certificates with a date of creation before the time of the compromise and with any certificate serial numbers. These certificates are then not contained in the certificate database of the certification authority. Since their certificate serial numbers are not known, they cannot be revoked. Additionally, the attacker can use the private signature key to also create certificate revocation lists in which certificate serial numbers of its forged certificates are not contained. In the case of such a serious compromise, it is thus not possible to trust any certificate issued by this certification authority again. The certificate of the certification authority needs to be revoked by a superordinate certification authority or—if it is a root certification authority (root CA)—replaced for all users. This also means that all certificates issued by the certification authority are revoked. A new certification authority needs to be set up, and all authorized certificate holders need to be supplied with new certificates.

For operative certificates for communication, signing of logging data, etc., methods for rolling them out and updating them are usually available, since these certificates are rather short-lived and thus need to be renewed at regular intervals. These methods may also be able to be used for distributing new operative certificates after a certification authority is compromised.

There is usually no provision for an update for manufacturer certificates and associated private keys, which are usually introduced into a device during production of the device or in another secure environment of the manufacturer, this being referred to as imprinting. To replace the manufacturer certificates, the devices would need to be returned to production or another secure environment at the manufacturer's, which entails enormous effort.

SUMMARY

An aspect relates to a method that allows secure exchange or secure replacement of a manufacturer certificate already introduced into a device with little effort, that is to say without removing the device from its place of use or returning the device to the manufacturer.

In accordance with a first aspect, embodiments of the invention relates to a method for securely replacing a first manufacturer certificate, already introduced into a device, with a second manufacturer certificate, wherein at least one specific device-related parameter that explicitly characterizes the device, is contained in the first manufacturer certificate and uniquely identifies the device is ascertained from a trusted device database, a second manufacturer certificate containing at least the specific device-related parameter of the first certificate and a public key of the device is generated, and the first manufacturer certificate is replaced with the second manufacturer certificate in the device.

Such a device database is frequently available in the production system at the manufacturers.

A certification authority also usually comprises a certificate database in which all certificates issued by this certification authority are stored with all the parameters contained in the certificate. This certificate database can also be used as a device database DB for the purpose of embodiments of the invention if it is still trusted and is not deemed to have been compromised.

A serial number of the device is used in manufacturer certificates as explicitly characterizing, specific parameter of a device, in particular.

The manufacturer certificate therefore confirms for a device that it is from a specific manufacturer and has a specific device serial number and further properties indicated in the parameters in the certificate. A certificate can therefore be uniquely assigned to a device and a new second manufacturer certificate having the same specific device-related parameters can be created. Depending on need, the second manufacturer certificate can substantially contain the parameters of the first certificate, for example merely issued by a new certification authority and therefore signed by this certification authority.

In one advantageous embodiment, the second manufacturer certificate is introduced into the device by an engineer, or is loaded from a data memory (server, network drive, etc.) by the device itself and installed, during a maintenance operation, in particular during a change of configuration of the device, or while an operative certificate is being updated.

The second manufacturer certificate is published by the manufacturer or made available to the owner of the device or to third parties. If the second manufacturer certificate has been issued by a second certification authority, a new certificate chain is also transmitted with the second manufacturer certificate. The second manufacturer certificate can then be introduced into the device by an engineer, or loaded from a data memory, for example a server, network drive, etc., by the device itself, and installed, during a maintenance operation or while an operative certificate is being updated. If the device does not have the functionality to introduce a new manufacturer certificate, the functionality can be added as part of a firmware update.

This has the advantage that replacing the manufacturer certificate does not require any additional new processes, and hence the financial and personal outlay for replacing the certificate is optimized.

In one advantageous embodiment, at least one certificate-related parameter, in particular a certificate serial number of the second manufacturer certificate or a validity period of the second manufacturer certificate, is generated independently of the corresponding parameters of the first certificate.

It is therefore possible for the validity period of a manufacturer certificate to be extended, for example, and, in particular, when the second certificate is issued by a second certification authority, a certificate serial number from the number range thereof can be used for the second manufacturer certificate.

In one advantageous embodiment, the device database is used to ascertain those devices to which a first manufacturer certificate has been issued by a compromised first certification authority and the first manufacturer certificate is replaced in the ascertained devices by a manufacturer certificate generated by the second certification authority.

As a result, for example all devices whose certificates were generated before a time at which the compromise took place can be ascertained and second manufacturer certificates can be generated for these devices.

In one advantageous embodiment, at least one additional device-related parameter of the first certificate is ascertained from the device database and is transferred to the second manufacturer certificate as a parameter.

This allows second certificates differing slightly in the parameters of the first certificate to be issued, for example in order to enter a manufacturer name that has changed. On the other hand, fewer device-related parameters can also be transferred to the second manufacturer certificate.

In addition, it is advantageous if a public key of the device in the first manufacturer certificate is transferred to the second manufacturer certificate as a public key. In such a case, it is not necessary for a new key pair to be generated for the device. The relationship between the public key and the other device-related parameters of the certificate, such as for example the serial number of the device, is maintained.

In one advantageous embodiment, the second manufacturer certificate is generated by a second certification authority and signed using the private key of the second certification authority and transmitted with a certificate of the second certification authority to the device, and the second manufacturer certificate is accepted in the device as a new manufacturer certificate if the second certificate of the second certification authority is confirmed as trusted by a root certificate that exists in the device.

When a root certificate exists for the certificate of the second certification authority, it is therefore possible for the trustworthiness of the second manufacturer certificates to be ensured without further exchange of root certificates.

In one advantageous embodiment, the second manufacturer certificate is generated by the first certification authority and signed using the private key of the first certification authority, and the second manufacturer certificate is accepted in the device as a new manufacturer certificate.

This allows replacement of a first certificate with a second certificate issued by the same, namely the first, certification authority. It is possible for changed or else new, device-related or else certificate-related parameters to be introduced as a result, for example. The trustworthiness of the first certification authority comes from the existence of a certificate of the first certification authority. Only when such a certificate of the first certification authority is revoked is such a second certificate not accepted by the device.

In one advantageous embodiment, the certification authority generates a new, second asymmetric key pair for each device, introduces the second public key, which is different than the public key of the first manufacturer certificate, into a second manufacturer certificate and provides the second private key associated with the second public key to the device in a manner cryptographically protected using the first public key of the first manufacturer certificate.

It is therefore also possible for new key material to be generated for the device and introduced into the devices. A private key requires additional protection, since it should be known only in the device. The encryption of the second private key using the first public key of the device allows the second private key to be transferred confidentially and hence securely. Since the device has received the first private key during manufacture, the device can decrypt the encrypted second private key and replace the first private key. Like the introducing of the second manufacturer certificate, the introducing of the second private key can be effected by an engineer as part of the maintenance or else by loading from a memory in a network.

A second aspect of embodiments of the invention relates to a system having a security function based on a public key infrastructure, comprising at least one device, at least one trusted device database and at least one certification authority, which are designed to perform the method described.

A further aspect of embodiments of the present invention relates to a computer program product (non-transitory computer readable storage medium having instructions, which when executed by a processor, perform actions) loadable directly in a memory of a digital computer, comprising program code parts suitable for performing the steps of the method.

The computer program product can be stored and executed in digital computers or microprocessors that are part of a device, of a device database or of a certification authority of the system according to embodiments of the invention.

BACKGROUND

Figure 2:
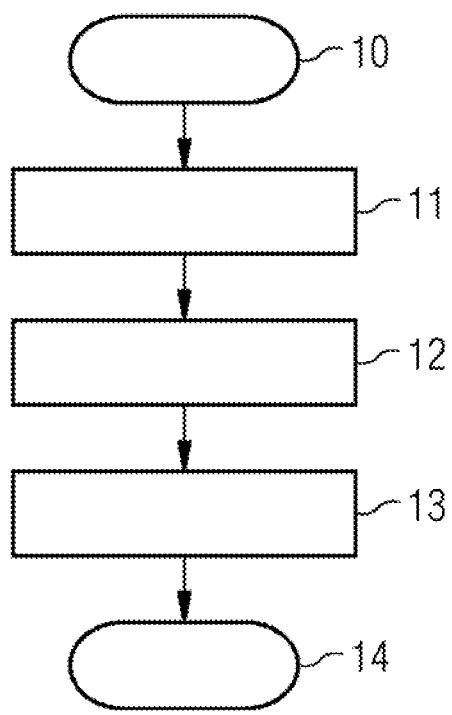

Some of the embodiments will be described in detail, with reference to the following figures, wherein like designations denote like members, wherein:

FIG. 1 shows an exemplary embodiment of a system according to embodiments of the invention in a schematic depiction; and FIG. 2 shows an exemplary embodiment of a method according to embodiments of the invention as a flowchart.

DETAILED DESCRIPTION

Mutually corresponding parts are provided with the same reference signs in all the figures.

FIG. 1 shows a system 1 depicted in simplified fashion having an installation network 2 in which devices D1, D2, such as for example control and signal components of a railway security network or field devices and control devices in an automation network, are connected to one another and communicate with one another. Corresponding systems are also used in the field of power supply or else in medical engineering.

In order to be able to check the integrity and authenticity of the communication between the devices D1, D2 and also the originality of a device D1, D2, what is known as a public key infrastructure is set up in the system 1. This involves the use of asymmetric crypto functions based on key pairs consisting of a public key and an associated private key to encrypt messages, to sign data or else to verify the originality of the device D1, D2.

A digital manufacturer certificate is introduced into the device D1, D2, that is to say is stored in the device D1, D2, during manufacture of the device D1, D2, for example, and is a digital data record that confirms specific properties of the device D1, D2 and the authenticity and integrity of which can be checked by cryptographic methods. The digital certificate contains the data required for checking it, in particular. The manufacturer certificate is issued by a certification authority CA1, for example.

A manufacturer certificate contains information, also referred to as parameters below, in particular certificate-related parameters and device-related parameters. The following are regarded as certificate-related parameters below:

a name or another unique descriptor of the issuer of the certificate, in particular of the issuing certification authority CA1, also referred to as "issuer",
a unique certificate serial number,
information pertaining to the validity period of the certificate.

Device-related parameters are in particular:
a unique descriptor of the device for which the certificate provides details, also referred to as "subject", for example device serial number, device type and manufacturer name,
MAC addresses and other communication parameters,
a public key of the device, and
further information pertaining to the device, such as details pertaining to the permissible scope of application and validity of the public key.

A private key associated with the public key is stored in the device in as securely confidential a manner as possible and should not be known to any other component in the system 1.

In addition, the manufacturer certificate contains a digital signature of the certification authority CA1 for all the other parameters. The certification authority CA1 creates the signature by means of a private key of the certification authority, also referred to as signature key of the certification authority. However, checking this signature of the certification authority CA1 again requires an association between the public key of the certification authority CA1 and its identity, i.e. a certificate of the certification authority. The trustworthiness of the certificate of the certification authority is again confirmed by a certification authority assumed to be trusted by means of what is known as a root certificate. Between the issuing certification authority and the certification authority assumed to be trusted, further certification authorities can confirm the certificate of the respective previous certification authority. This hierarchy of certificates forms a public key infrastructure (PKI). In order to be able to check the trustworthiness of the manufacturer certificate, the checking unit needs to exist the entire certificate chain from the certificate of the issuing certification authority D1, D2 to the root certificate.

Each device D1, D2 contains a first manufacturer certificate, specific to the device, that was issued by the first certification authority CA1 and was introduced into the device D1, D2 during manufacture, for example, and is stored in the device. Usually, the manufacturer runs a device database DB containing device-related characteristic data for all manufactured devices, such as for example a serial number of the device, serial numbers of the components installed in the device, information pertaining to installed firmware, MAC addresses, and at least one also characteristic data pertaining to the manufacturer certificate introduced into the device D1, D2, such as for example certificate serial number, validity period. At least some of these characteristic data stored in the device database DB correspond to the device-related or else certificate-related parameters contained in the certificate. The database DB comprises the information pertaining to the issuing certification authority CA1 for a device certificate introduced into a device.

If the issuing first certification authority CA1 is then compromised, the first certificates issued thereby can no longer be trusted. The measures that need to be taken following the discovery of a compromise are dependent on the type of compromise. If an attacker was able to prompt the first certification authority CA1 to create individual certificates without being able to gain possession of the private key of the first certification authority, e.g. by copying the key, and if all certificates created without authorization are known, then it is sufficient to revoke these first certificates.

If there is the suspicion that an attacker had certificates created by the first certification authority without authorization during a known period, without these certificates being precisely known, then it is sufficient to revoke all first certificates generated during this period. However, this requires the certificate serial numbers of these certificates to be known.

For non-self-signed and operative certificates used for communication by the device with other devices or for signing logging data, certificate revocation can be performed by the issuing certification authority using a standardized certificate revocation list in accordance with the Internet Engineering Task Force IETF standard RFC 5280 or in accordance with an Online Certificate Status Protocol OCSP, see IETF RFC 6960. Self-signed certificates need to be removed from the memory for trusted certificates for the purpose of revocation.

If an attacker was able to find out the private key of the certification authority, he can use it to generate afresh any certificates at any time. He can thus also use it to generate backdated certificates whose "validity—notBefore" value contained in the certificate is in the past, i.e. before the time of the compromise, and can provide them with any certificate serial numbers. These externally created certificates of the attacker are then typically not contained in the database of the certification authority.

A third party can thus no longer trust any of the certificates generated by this first certification authority CA1. The certificate of the certification authority needs to be revoked and a new certification authority instance needs to be created.

Users, in particular the holders, of the certificates subsequently require new certificates. For operative certificates, for example, this is possible, albeit with associated effort, by means of already established processes for rolling out and updating these certificates. There is not this opportunity for manufacturer certificates, however, since there is no provision for these certificates to be updated. In order to replace the manufacturer certificates, the devices would need to be returned to production or to another secure environment at the manufacturers. This represents an enormous effort and is probably infeasible in many cases.

For the purpose of replacing manufacturer certificates, there is arranged in a manufacturer network 3 within the system 1 a first certification authority CA1 or a second certification authority CA2 that are designed to issue manufacturer certificates. The first certification authority CA1 and a second certification authority CA2 are usually not present in the system 1 at the same time. The second certification authority CA2 is usually present in the manufacturer network 3 only if the first certification authority CA1 is taken out of operation on account of a detected compromise, for example. In addition, the manufacturer network 3 comprises a trusted database DB, for example a database DB in the production system of the manufacturer, as already described. A database associated with the first certification authority CA1 that has not been affected by a compromise in the first certification authority CA1 can also be used as a trusted database DB. The manufacturer network 3 is separate from the installation network 2 or merely connected to the installation network 2 and hence the devices D1, D2 for a limited time, for example to replace manufacturer certificates during a certificate update.

A replacement of a first manufacturer certificate that is no longer trusted with a second manufacturer certificate issued by the second certification authority is explained in more detail on the basis of the flowchart depicted in FIG. 2.

In the initial state 10, there is a request to exchange first manufacturer certificates already introduced in a device, which are supposed to be replaced by a new second manufacturer certificate. If for example all first certificates of a compromised first certification authority CA1 are supposed to be replaced, method step 11 involves information about which devices have received first manufacturer certificates from the first certification authority CA1 being ascertained from the database DB. This information comprises at least one specific device-related parameter that is contained in the first manufacturer certificate and uniquely identifies the device. This is the serial number of the device, which is indicated in the "subject" field in the certificate. In addition, the first public key of the device is ascertained from the database DB, which key will either be contained in the second manufacturer certificate or is used for encrypting the second private key.

In addition, it is possible to ascertain from the database DB at what time the first certificate was created or at what time the device D1, D2 received the first certificate, and further device-related information, such as for example the device type, and more. This information can also be contained in the first certificate as device-related parameters. This information or these device-related or certificate-related parameters of the first certificate is/are transmitted to a second certification authority CA2 or read from the database DB directly by the second certification authority CA2.

The second certification authority CA2 generates a new second manufacturer certificate for each of these devices in method step 12. Further parameters that were contained in the first manufacturer certificate can be transferred to the second manufacturer certificate in the process. Such further parameters are for example the public key of the device or else certificate extensions, referred to as "public key" or "extensions" in a digital certificate according to ITU standard X.509, for example. Only as the issuer of the certificate is the applicable value of the second certification authority CA2 used. Further certificate-related parameters such as a validity and a serial number of the certificate, as "Validity" and "serial number" in the certificate, are generated afresh in the second manufacturer certificate. Subsequently, the second manufacturer certificate is signed using the private key of the second certification authority CA2.

Transport of the second certificates and if need be of the encrypted second private keys to the devices can take place in a wide variety of ways, for example by email or physical data carrier or via a web portal of the manufacturer to a service engineer, who then loads the certificates into the devices D1, D2 locally or via the installation network 2, for example, or provides them for download by the devices D1, D2 on a memory, not depicted in FIG. 1, in the installation network 2.

These second manufacturer certificates are subsequently introduced into the second devices D1, D2 in method step 13. This can be effected for example in the course of standard maintenance processes such as a configuration update or updating of operative certificates of the devices D1, D2.

If a multilevel PKI hierarchy is used, a trusted certification authority thus signs the certificate of the certification authority CA1, and the certification authority CA1 signs the manufacturer certificate of the device. If the trustworthiness of the first and second certification authorities CA1, CA2 is confirmed by the same trusted root certification authority, then additionally only the certificate of the second certification authority is provided to the devices.

If the trusted root certification authority is also compromised which will happen more rarely, since it can be better protected —, certificate exchange of the root certificate needs to be safeguarded by means of further processes. Alternatively, a second root certificate can already be introduced in the device D1, D2 by a further trusted certification authority beforehand, for example during production.

The private key of the second root certificate is either kept in particularly safeguarded fashion at another location just for this emergency or used for other tasks, for example to create certificates for software or firmware signatures.

It is not necessary to return the devices D1, D2 to production, to generate a new key pair there for each device and to sign the public key in a certificate, since the relationships between the public key and other device-related parameters, in particular the device serial number, in the second manufacturer certificate have been preserved identically to those in the first manufacturer certificate.

In another advantageous configuration, it is possible to supply devices D1, D2 with new, second manufacturer certificates without the first certification authority CA1 having been compromised. This may be useful, for example, if the devices D1, D2 are supposed to be replaced with manufacturer certificates having a different term, different algorithms or different parameters, for example in the event of an error in the first certificate, a change of manufacturer name, a change of data for legal reasons.

In one advantageous configuration, it is also possible to generate and distribute not only new manufacturer certificates but also new, second key pairs, consisting of a second private and a second public key, for the devices D1, D2 whose public keys are still trusted despite the first certification authority CA1 having been compromised, since they can be read from a trusted database. In this case, a second manufacturer certificate is generated for a device D1, D2, the certificate containing the second public key as parameter instead of the first public key. The further first parameters are transferred to the second manufacturer certificate as second parameters, where required. The second manufacturer certificate is signed by the issuing certification authority, as already described.

The second private key of the devices D1, D2 is transmitted in the form of a Public Key Cryptography Standard PKCS #12 file for example.

The second private key is encrypted and hence cryptographically protected by means of the first public key of the device. It is thus possible for only the device that is in possession of the first private key to decrypt and use the second private key.

The trusted database DB allows the manufacturer of the devices D1, D2 to ascertain which first manufacturer certificates it can still trust despite the first certification authority having been compromised, and hence to safely supply the relevant devices with new key material too.

Information from an available trusted database DB can therefore be used at the manufacturers to create new manufacturer certificates without the relevant devices D1, D2 needing to be removed in the field and returned to the manufacturer for renewed certificate imprinting. This is possible only because the manufacturer knows this database DB and thus knows which first certificates of a compromised first certification authority CA1 it can nevertheless trust. Third parties that cannot access this database DB thus also cannot distinguish whether a manufacturer certificate has actually been created by the first certification authority CA1 before the time or whether an attacker has created and backdated it without authorization later on.

It is therefore possible for new manufacturer certificates to be created by a second certification authority CA2 for all devices whose public keys together with the data identifying the device, e.g. serial number of the device, are known for certain. The devices can remain in the field to replace the manufacturer certificates. The key pair in the device can optionally either continue to be used or else be securely replaced.

All the features described and/or shown can be advantageously combined with one another as part of embodiments of the invention. The invention is not restricted to the exemplary embodiments described. The method can be used not only for manufacturer certificates on devices but in principle also for all other certificates, provided that there is a suitable, uncompromised, database. However, it is particularly advantageous for manufacturer certificates, since in this instance there is no provision for replacement of certificates that have been rolled out and such replacement is thus particularly difficult.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for securely replacing a first manufacturer certificate, already introduced into a device, with a second manufacturer certificate, the first manufacturer certificate and the second manufacturer certificate being used for proving originality and as trust anchors for requesting further security-relevant data, the method comprising:

ascertaining at least one specific device-related parameter that explicitly characterizes the device, which is contained in the first manufacturer certificate and uniquely identifies the device from a trusted device database, wherein a first certificate authority and the trusted database are present within a network, and the first certification authority issues the first manufacture certificate to the device;

in response to a first certification authority becoming compromised, removing the first certification authority from the network so that a second certification authority is present in the network and connected to the trusted database over the network;

generating, by the second certification authority, the second manufacturer certificate comprising at least the explicitly characterizing device-related parameter of the first certificate and a public key of the device, wherein the trusted device database is used to ascertain all devices connected to an installation network to which the first manufacturer certificate has been issued by the compromised first certification authority; and replacing the first manufacturer certificate issued by the first certification authority with the second manufacturer certificate generated by the second certification authority in the device, wherein the public key of the device is introduced into the second manufacturer certificate and is different than a public key of the first manufacturer certificate, and a private key associated with the public key of the device is provided to the device in a manner cryptographically protected by the public key of the first manufacturer certificate.

2. The method as claimed in claim 1, wherein the specific device-related parameter is a unique serial number of the device.

3. The method as claimed in claim 1, wherein the second manufacturer certificate is introduced into the device during a change of configuration of the device, or while an operative certificate is being updated.

4. The method as claimed in claim 1, wherein a certificate serial number of the second manufacturer certificate and/or a validity period of the second manufacturer certificate, is generated independently of the corresponding parameters of the first certificate.

5. The method as claimed in claim 1, wherein at least one further device-related parameter of the first certificate is ascertained from the trusted device database and is transferred to the second manufacturer certificate as a parameter.

6. The method as claimed in claim 1, wherein the second certification authority generates the second manufacturer certificate and signs the second manufacturer certificate using the private key of the second certification authority, and the second manufacturer certificate is transmitted with a certificate of the second certification authority to the device, and the device accepts the second manufacturer certificate as a new manufacturer certificate.

7. The method as claimed in claim 1, wherein the public key of the device in the first manufacturer certificate is transferred to the second manufacturer certificate as a public key.

8. A system having a security function based on a public key infrastructure, comprising:
one or more processors associated with at least one trusted device database, at least one certification authority, and at least one device, the one or more processors configured to perform a method, the method comprising:
ascertaining at least one specific device-related parameter that explicitly characterizes the device, which is contained in the first manufacturer certificate and uniquely identifies the device from a trusted device database, wherein a first certificate authority and the trusted database are present within a network, and the first certification authority issues the first manufacture certificate to the device;
in response to a first certification authority becoming compromised, removing the first certification authority from the network so that a second certification authority is present in the network and connected to the trusted database over the network;
generating, by the second certification authority, the second manufacturer certificate comprising at least the explicitly characterizing device-related parameter of the first certificate and a public key of the device, wherein the trusted device database is used to ascertain all devices connected to an installation network to which the first manufacturer certificate has been issued by the compromised first certification authority; and
replacing the first manufacturer certificate issued by the first certification authority with the second manufacturer certificate generated by the second certification authority in the device, wherein the public key of the device is introduced into the second manufacturer certificate and is different than a public key of the first manufacturer certificate, and a private key associated with the public key of the device is provided to the device in a manner cryptographically protected by the public key of the first manufacturer certificate.

9. The system as claimed in claim 8, which is a part of an industrial installation.

10. A computer program product comprising a non-transitory computer readable storage medium having instructions, which, when executed by a processor, performs a method comprising:
ascertaining at least one specific device-related parameter that explicitly characterizes the device, which is contained in the first manufacturer certificate and uniquely identifies the device from a trusted device database, wherein a first certificate authority and the trusted database are present within a network, and the first certification authority issues the first manufacture certificate to the device;
in response to a first certification authority becoming compromised, removing the first certification authority from the network so that a second certification authority is present in the network and connected to the trusted database over the network;
generating, by the second certification authority, the second manufacturer certificate comprising at least the explicitly characterizing device-related parameter of the first certificate and a public key of the device, wherein the trusted device database is used to ascertain all devices connected to an installation network to which the first manufacturer certificate has been issued by the compromised first certification authority; and
replacing the first manufacturer certificate issued by the first certification authority with the second manufacturer certificate generated by the second certification authority in the device, wherein the public key of the device is introduced into the second manufacturer certificate and is different than a public key of the first manufacturer certificate, and a private key associated with the public key of the device is provided to the device in a manner cryptographically protected by the public key of the first manufacturer certificate.

* * * * *